US008370939B2

(12) United States Patent
Zaitsev et al.

(10) Patent No.: US 8,370,939 B2
(45) Date of Patent: Feb. 5, 2013

(54) PROTECTION AGAINST MALWARE ON WEB RESOURCES

(75) Inventors: Oleg V. Zaitsev, Smolensk (RU); Vitaly I. Denisov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 250 days.

(21) Appl. No.: 12/906,183

(22) Filed: Oct. 18, 2010

(65) Prior Publication Data

US 2012/0023579 A1     Jan. 26, 2012

(30) Foreign Application Priority Data

Jul. 23, 2010  (RU) ................................ 2010130874

(51) Int. Cl.
*G06F 12/14*   (2006.01)
(52) U.S. Cl. .......................................................... 726/23
(58) Field of Classification Search ........................ None
See application file for complete search history.

(56) References Cited

U.S. PATENT DOCUMENTS

| 6,785,732 | B1 | 8/2004 | Bates et al. |
| 7,177,937 | B2 | 2/2007 | Bates et al. |
| 7,376,735 | B2 | 5/2008 | Straut et al. |
| 2007/0174324 | A1 | 7/2007 | Palapudi et al. |
| 2009/0222899 | A1 | 9/2009 | Walters |
| 2010/0046553 | A1* | 2/2010 | Daigle et al. ................ 370/474 |

FOREIGN PATENT DOCUMENTS

| EA | 0001895 | 2/2001 |
| TW | 0550485 | 9/2003 |
| WO | WO0158131 | 8/2001 |
| WO | WO0191350 | 11/2001 |
| WO | WO0197134 | 12/2001 |

OTHER PUBLICATIONS http://labs.adobe.com/technologies/browserlab/, Printed Dec. 26, 2010.

* cited by examiner

*Primary Examiner* — Brandon Hoffman
(74) *Attorney, Agent, or Firm* — Bardmesser Law Group

(57) ABSTRACT

A method and system for identification of malware threats on web resources. The system employs a scheduled antivirus (AV) scanning of web resources. The scheduled scanning of web resources allows to create malware check lists and to configure access to web resources. Frequency and depth of inspection (i.e., scan) are determined for each web resource. The user identifiers are used for scheduled AV scanning of web resources. The system allows for scanning a web resource based on selected configurations without using additional client applications.

20 Claims, 6 Drawing Sheets

PROTECTION AGAINST MALWARE ON WEB RESOURCES

CROSS-REFERENCE TO RELATED APPLICATIONS

This application claims priority to Russian Patent Application No. 2010130874, filed Jul. 23, 2010, which is incorporated by reference herein in its entirety.

BACKGROUND OF THE INVENTION

1. Field of the Invention

The present invention is related to methods of protection against malware located on web resources and, in particular, to malware scans of web resources and identification of malware components on web resources.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers and networks through communications or file exchanges is an increasingly significant consideration. Infections take various forms, but are typically related to computer viruses, Trojan programs, or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail and networking capability. In many instances, attempts to adequately prevent file exchange or e-mail mediated infections significantly inconvenience computer users.

Popularization of web services increases malware-related threats to web clients. With the development of web-technologies, such as AJAX, JAVA, PHP, FLASH, etc., web sites become more accessible, with more functionality with various media content, which enhances their appeal and popularity among users. With the introduction of methods of designing web-systems, known as Web 2.0, users have been enabled to not only receive information from the Internet, but also fill out web sites with their own data.

Many Internet users have their own blogs, pages within social networks, where they can share messages or data with other users. In addition to text messaging, modern technologies support transfer of media files, such as photos, video files, interactive documents, animations and applications.

Active participation of users in creation and modification of a web site leads to a rapid development and changes of the site content. A typical example of such a site is a news ticker, where new articles with links to news reports, photos or videos appear at intervals of a minute and sometimes even more often. Another example is a web forum, where a number of users can be in excess of several thousand, and where new messages appear every second.

Increasing popularity of web resources makes this environment more attractive to hackers and virus writers, who spread malicious programs over the Internet. A malicious script, such as iframe, exploits, etc. can be added to the files uploaded to the site. Thus, file exchanges, forums, blogs, web-interfaces of mail servers and any other resources can be infected.

The infection can be perpetrated through any interface, such as a usual web site form to be filled out by a user (in this case, the infection is performed mostly manually by an insider or an intruder who stole passwords). A perpetrator can exploit vulnerability in the content management system or file access the site via FTP. The list of resources is not limited to the http transfer protocol but also includes ftp-resources and other servers.

Typically, ftp-servers are used as tools for remote administration of the sites, including editing and uploading scripts. However, a connection to the ftp-server provides the ability to test all scenarios of site, and not just those that are executed on the user's computer. Access the site files via FTP allows a security system to analyze the source scripts and original pages, while access via http allows to examining only the result of the script and/or the result of processing of the web site files by a web server.

An unauthorized access to a user account and uploading on behalf of this user, a malicious program could lead to a rapid spread of malware because of the credibility of that person among other users. When dealing with mundane sites, users' attention may fade over time due to the usual circumstances. Because of this, incidents of exploitations of social networks and phishing are increasing.

In addition to public Internet services, there are some local sites (corporate, local area networks, user group sites, etc.) that are not accessible from outside of their network. This imposes significant problems in malware scanning of a given resource by anti-virus services or laboratories.

A typical scheme of interaction between a user computer system and a Web resource is illustrated in FIG. 1. Web-server is an application that performs the functions of the server (i.e., a computer system) on which the application is implemented. In addition to web-servers 110 or ftp servers 120, other server applications can be installed. For example, mail servers, proxy servers, IRC-server, etc. In order to interface with these servers, client (i.e., a user) computers 140 must have special applications installed, such as, a browser 130, a file manager 150, etc.

Client 140 access the web server 100 using a URL address of a desired web page or other resource. Each server application and a client interact, using different protocols. The primary protocols for data transfer between the client 140 and server 100 are HTTP (HTTPS), (S) FTP, POPS, SMTP, IMAP4, etc.

Most servers support authentication in the following manner: an authorization data is transferred from the client 140 to the server 100, where the authorization takes place. Then, the data is transmitted from the server 100 to the client 140 based on the rights granted to the client 140.

Personalization makes it possible to make a web resource unique to each user. Authorization is used to distinguish users, their rights and available data. User authorization is carried out by the user via a client application, for example, by filling the forms in the browser. Very often these applications allow preserving the identity of the user. Thus, each user can customize his own interface, to restrict access to his personal page or email, to identify the displayed pages by sections or topics.

In order to provide security while using Internet or on the local network, downloadable content needs to be checked. A downloaded page may contain viruses, trojans, adware, spam, exploits (i.e., HTML code, links to image or ".pdf" file, which has special modifications that result in browser errors and execution of some potentially harmful code) for applications (such as for example, PDF-reader, web browser, media player, flash-player, etc.)

A system of protection of personal computers can include a file anti-virus (AV), network screen, a firewall, a special protection against network attacks, Web anti-virus as well as remote security means of AV vendor companies. Currently AV technologies are heavily developed and includes many different methods and systems that implement both heuristic and signature analysis.

The signature type web analysis includes:
assembling black list of pages (URL-blacklist);
assembling white lists of trusted (i.e., clean) applications/components; and
storing a collection of malware components.
The heuristic analysis typically includes any of:
emulation of executable programs/components;
emulation of executable scripts;
virtualization of execution environment; and control and analysis of application activity.

A firewall or a network screen is necessary for monitoring and filtering network packets at different levels of the OSI model in accordance with assigned rules for network connections: filtering based on static rules and filtering with tracking executed applications and controlling logic and algorithms of the relevant protocols.

A system for protection against network attacks is typically launched at system startup and monitors incoming traffic activity for patterns typical of network attacks. If an attempt to attack a computer is detected, the system blocks any network activity for the attacker to a protected computer.

A conventional web anti-virus (web AV) intercepts and blocks execution of a malicious script on a web site if it poses a threat. Strict control is also imposed over all HTTP-traffic. Web AV also analyzes web resources for phishing scams and filters banners and pop-ups.

Another line of defense can be a local security server that analyzes the situation within a local network, scans the local traffic and analyzes the network activity of computers. There are also web services that allow the verification of the Internet resource or files. The user downloads a file or enters a URL of the resource and the entire malware test takes place on the web-service of an AV company.

In the case of local AV remedies, a web resource is checked when it is downloaded, in other words, when the client application goes to the corresponding URL-address. It is important to note that in this case, the user is authenticated on the web resource and downloads content, as defined for his user account. The content can be in form of scripts, links, articles, messages, reports, letters from trusted users, etc.

FIG. 2 illustrates a conventional system for checking a web resource 200 for presence of malware or links to infected resources. A connection with the resource 200 is established by an application 220 of a client 210. The client application 210 in this case can be a regular browser, a file manager or another application that interacts with a server 200 via data transfer protocol 230.

The client application 220 transmits to the server 200 user identifiers 250. Depending on authentication scheme 260, the identifiers 250 can represent logins, passwords, session keys, cookie-files, special protocol headers, network or physical addresses of the computer, biometric data, certificates, etc. A request to the server 200 by the client-application 220 is processed by a server application 240.

An authorization 260 is performed, and depending on its results, the server 200 opens a document or generates a web page, an ftp-page or other data representation based on the data type provided by the server 200. Security of data transmitted between the client 210 and the server 200 is provided by a security module 270. This conventional system can be implemented on a personal computer as well as on a web server of an AV company. Typically, the relevance of the AV databases and the effectiveness of heuristic analysis on the server side can be higher than on a personal computer.

However, the principal difference in this case is the data presented by a web resource 200 being tested for malware presence based on the user identification data 250. When the AV check takes place on the server, the result of the authorization is either denial of access or a grant of the rights of the guest account. Thus, the outcome of an AV check, even at equal technological capabilities on the server and the user computer, will be significantly different.

Yet another shortcoming of conventional AV systems is restrictions imposed upon AV web-based scanners by routing rules. If a web resource is part of the network and has no external network address, it is not available outside the network, and it can only be verified by using other security tools installed on a computer system connected to this network.

Many malware creators and hackers are aware of online scanners and knowingly block access of the scanner applications to a web resource where they have planted malware components. This makes comprehensive malware scans difficult. Furthermore, in the conventional systems, a web page cannot be scanned until it is downloaded onto a user computer. A typical web resource can contain several thousand pages. AV checking all of the web pages using a conventional system (as illustrated in FIG. 2), requires a lot of time and resources.

The situation is further complicated when several different web resources need to be periodically scanned. Statistics indicate that the majority of malware components and links to infected pages are located on the main (i.e., home) pages of web resources or on the first pages of sub-sections. This also complicates AV checking process, since each server often uses different identification parameters. In order to check a list of web resources, an AV application needs to have access authorization that also complicates scanning web sites for malware.

Accordingly, there is a need in the art for a comprehensive malware scanning system that can effectively check the web resources with a minimal overhead and costs.

SUMMARY OF THE INVENTION

The present invention is related to methods of protection against malware and, in particular, to identification of malware threats on web resources. The present invention provides an anti-virus (AV) system for malware scanning of web servers and other web resources that substantially obviates one or several of the disadvantages of the related art.

In one aspect of the invention a system for identification of malware components on web resources is provided. According to an exemplary embodiment, the system has a schedule for scanning web resources. The scheduled scanning of web resources allows to create check lists, configure access to web resources and to determine frequency and depth of inspection (i.e., scan). The exemplary embodiment advantageously allows for scanning a web resource based on selected configurations without use of additional client applications.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, a method and system for identification of malware threats on web resources are provided. The system of the exemplary embodiment employs a scheduled AV scanning of web resources. The scheduled scanning of web resources allows creating malware check lists and configuring access to web resources. Frequency and depth of inspection (i.e., scan) are determined for each web resource. The exemplary embodiment advantageously allows for scanning a web resource based on selected configurations without using additional client applications.

Figure 1:
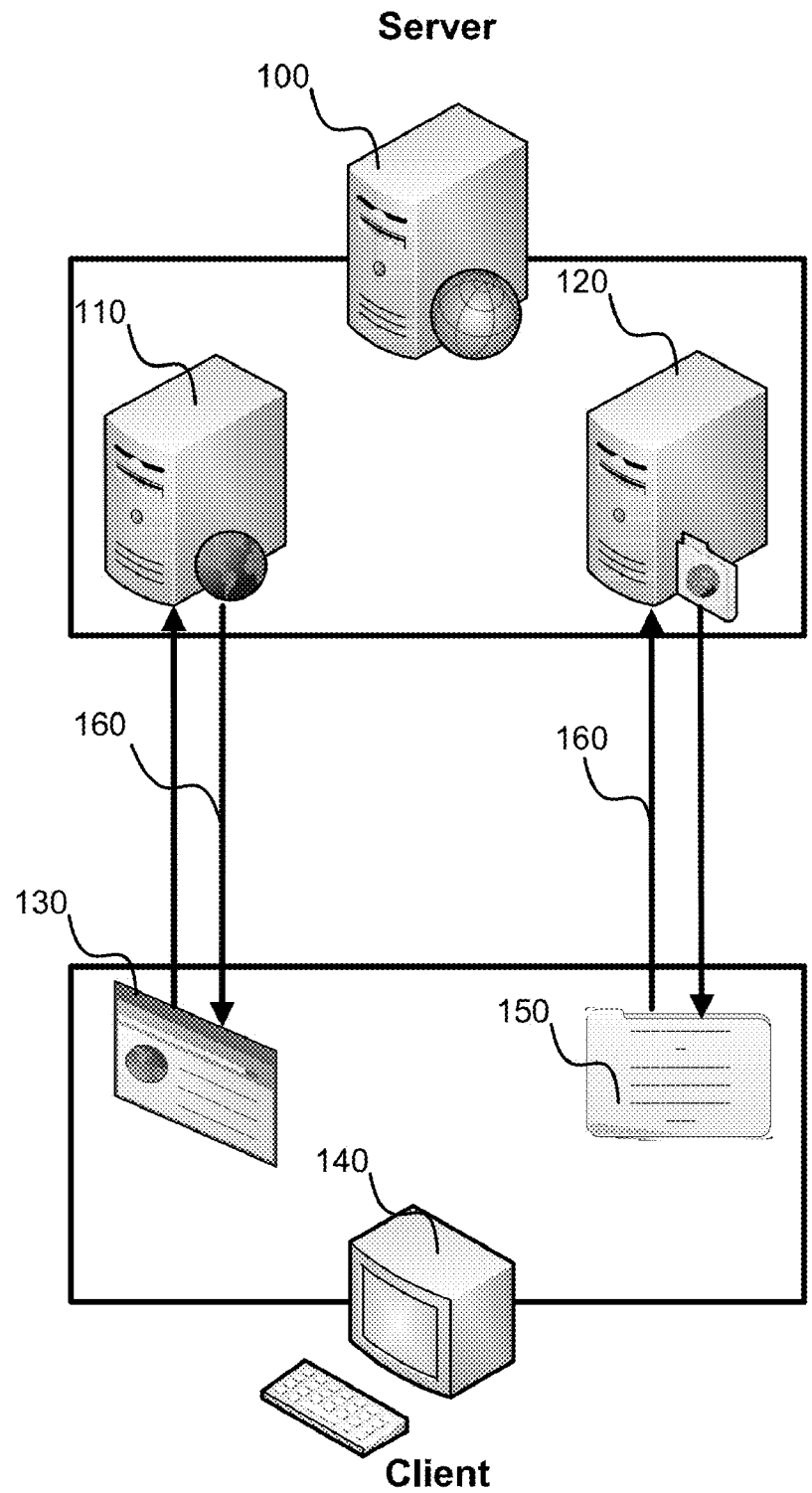
FIG. 1 illustrates a conventional system for accessing a web resource by a client.
Figure 2:
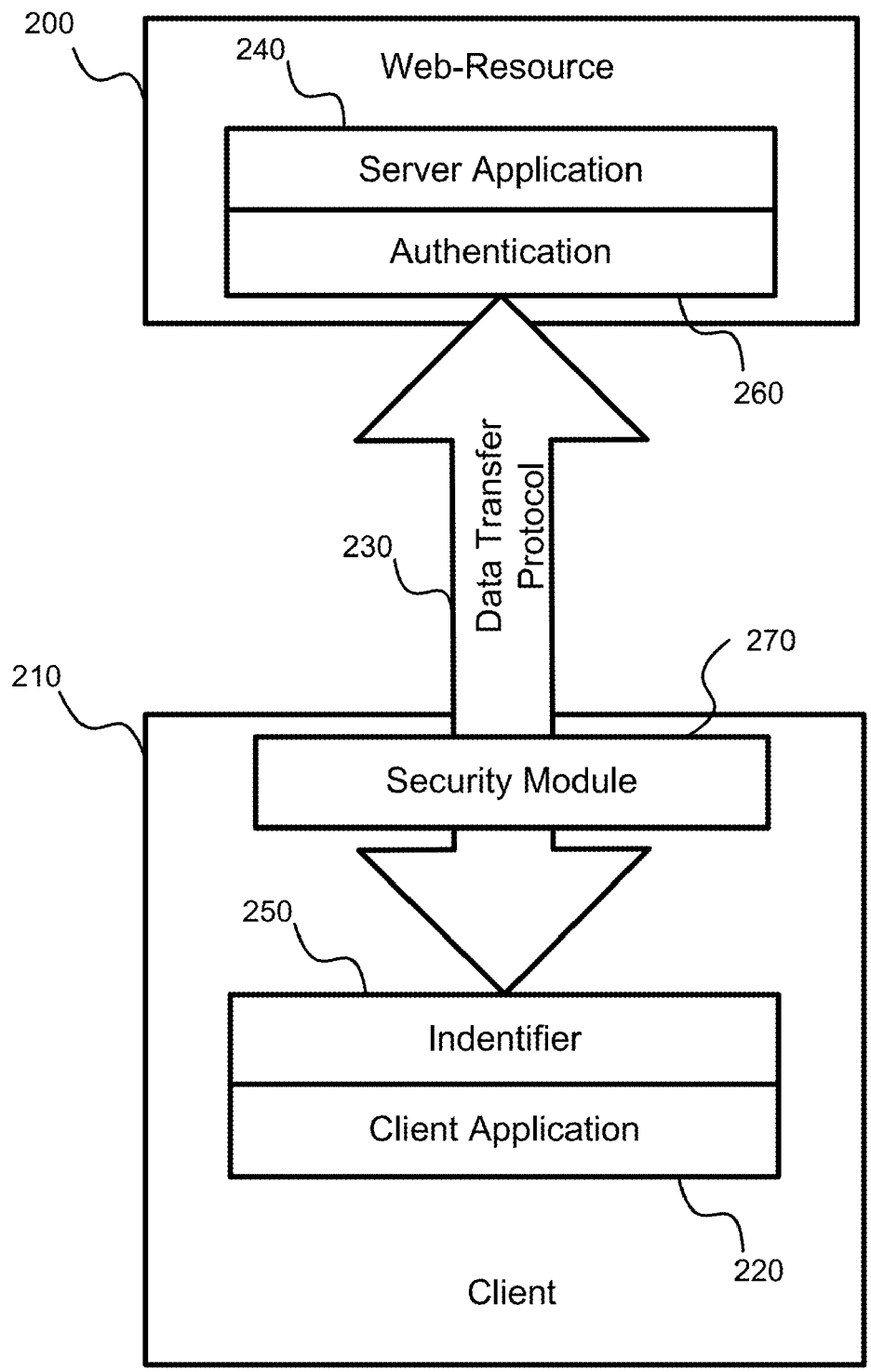
FIG. 2 illustrates a conventional system for monitoring web resources.
Figure 3:
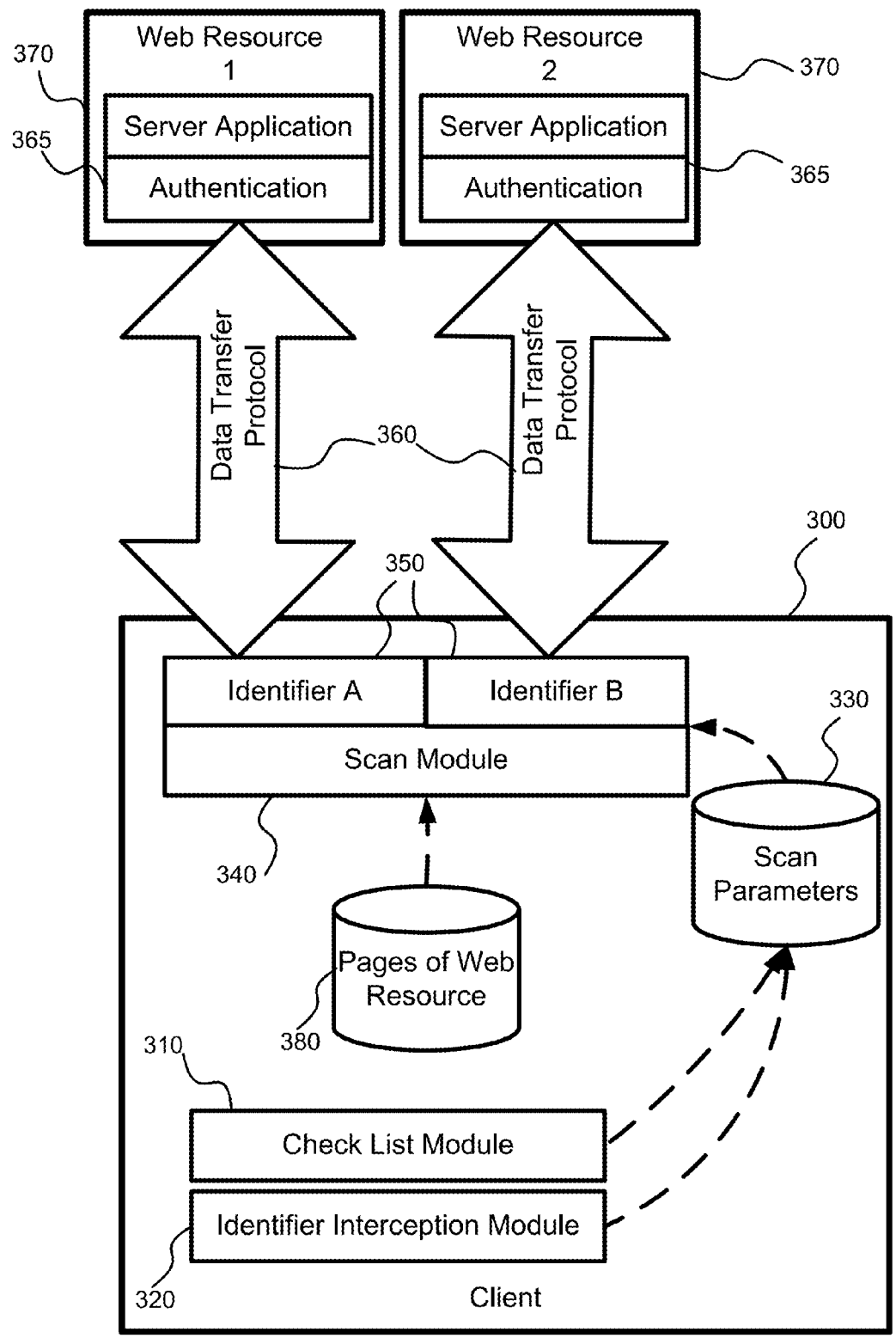
FIG. 3 illustrates a system for monitoring web resources in accordance with the exemplary embodiment.

The system for scheduled scanning of web resource, in accordance with the exemplary embodiment, is illustrated in FIG. 3. This system checks web resources for vulnerabilities and malicious applications (i.e., malware components), and informs users about malware threats. The system includes several modules: a checks list module 310 responsible for generating check list for scanning a web resources 370; an identifier interception module 320; a database of checking parameters 330 used during the scheduled scan; and a security scan module 340.

According to the exemplary embodiment, a system for performing scheduled scans of the web resources can be implemented as a separate computer system located on a remote server or on a client computer. For effective operation of the monitoring system, certain parameters need to be configured. First, a check list for scanning a web resource needs to be generated by the check list module 310.

There are a number of web resources (or even particular portions of web resources), that are visited by a particular user more frequently. User visits can be tracked, for example, by a browser plug-in that keeps the visit logs, by parsing network traffic and retracting links from packets or by using password managers for site access. Also, there are some web resources, whose protection is of a particular importance to the user, for example, if the user is an author, an administrator or an owner of these web resources. In this case, the user needs to determine that the resource is infected as soon as the infection occurs.

Most of the addresses of web resources can be listed by a user himself. However, in order to simplify the process and to eliminate some instance of lost or forgotten addresses, the check list module 310 records page addresses based on results of a scan. The check list is created by keeping and importing the log of visits, "favorites" or other sources. In one embodiment, the check list is filled out automatically by adding and/or deleting web resources depending on number of user visits and time of last visit. This can be accomplished by application of semantic rules with variables such as "many visits," "few visits," "long time ago" and "recently." For example, if a user infrequently visits the sites (number of accesses up to 100 per day), but he visited a resource of interest 10 times, this would correspond to a variable "many visits." If a number of accesses for this user are more than a 1000 per day, the 10 visits to the resource of interest will correspond to "few visits." The same works with the time of visits. For example, one month can be considered "long time ago" and one day ago can be considered "recently".

Authorization to a web resource plays a crucial part for scheduled malware scanning of the web resource. Authorization parameters need to be configured. Depending on these parameters, data downloaded from the same web resource can differ. Moreover, in some special cases, a user can have multiple accounts on the web resource, or a user can have administrative rights, if he is the owner or developer of the web resource.

Keeping track of user identifications on a web resource is performed by the identifier interception module 320. Alternatively, user identification data (such as login and password) can be manually entered or provided to the identifier interception module 320. Another possibility is an intelligent registration of identification data. The intelligent registration is performed during execution of a client application at the moment of authorization (i.e., key transfer to the server). Access keys are transferred over network when an application accesses a server. The keys can be intercepted in the same manner as user check lists and identifiers.

For example, in the case of http protocol, cookie-files, get-titles and post-titles are registered. The identifier interception module 320 can be configured to intercept user identifiers by default or on demand. It can also import data from the system folders of client applications.

Scan parameters (i.e., check lists and user identifiers at the appropriate web resources) are stored in a scan parameters database 330. In addition to these parameters, the database 330 stores configurations for depth and frequency of scanning. When a web page is scanned, references to portions or other resources are defined within the page. A section of the page can also contain references to other sub-sections and etc. The depth of scanning is a number of sub-sections that are checked during the scan of a specified web resource.

If the scan depth is set at "0", then only the page with a corresponding web address is checked during the scan. If the scan depth is set at "1", then all the pages referenced (i.e., hyperlinked) on the first page are also checked during the scan. In other words, if the scan depth is set at "N", then all of the references to pages of N levels are scanned.

Use of the scan depth parameter simplifies the process of malware scanning and scan configuration for large and complex web portals. The scan frequency affects the efficiency of detection of infection or malware threat. The scan frequency parameter is particularly relevant if the volume of data to be scanned is very large and priorities for scanning the resources are set. The scan frequency parameter is also used when there is a need for economy of computational resources for anti-malware processing. According to the exemplary embodiment, the scan frequency is set by an administrator.

Alternatively, the scan frequency can be set automatically based on time of response of particular resource. For example, if a response time is long, it means that the site is overloaded. Thus, scan frequency can be defined by a function that uses time of a last response and an average response time as parameters. The scan frequency can be also defined by frequency of updates and modifications of the site. If the site is updated often, it needs to be scanned more frequently.

The scan frequency can be determined based on known hacker attacks to the site. If the site has been hacked, it needs to be scanned more often. All of the above consideration can be used in form of an algorithm that automatically defines scan frequency for a particular resource. Such an algorithm can use an arbitrary number of parameters and produce an exact number for scan frequency in hours and minutes.

Figure 4:
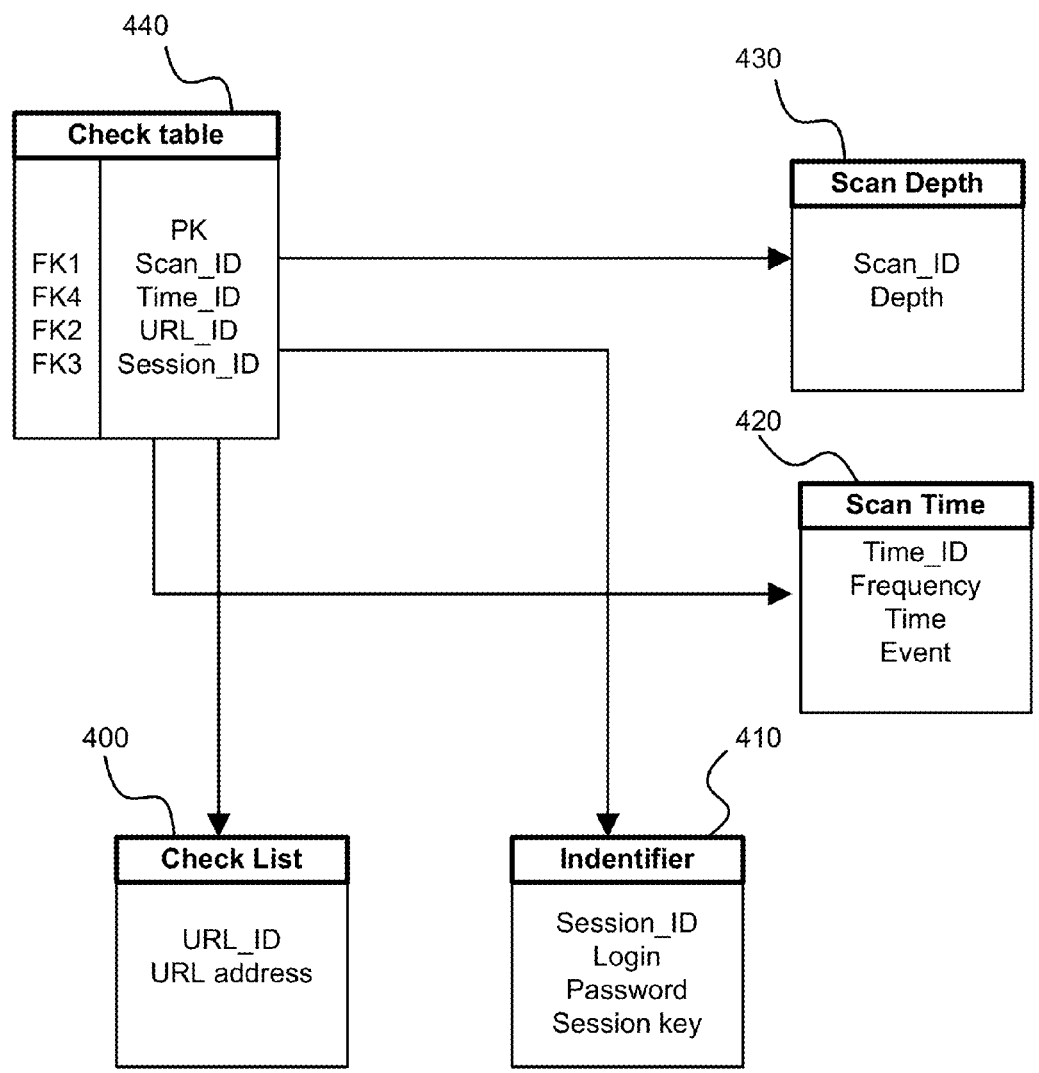
FIG. 4 illustrates a structure of a scan parameters database, in accordance with the exemplary embodiment.

An exemplary structure of the scan parameters database 330 is shown in FIG. 4. The exemplary database has the following tables: a check list of resources 400, an identifiers table 410, a scan frequency table 420 and a scan depth table 430. The identifiers table 410 has the following fields: session_ID, username, password and session key. The scan frequency table 420 has the following fields: Time_ID, time, frequency and event. The check list table 400 contains two data fields: URL_ID and URL_address. The scan depth table 430 also contains two fields: Scan_ID and scan_depth.

The tables within the scan parameters database 330 are connected by the check table 440 that contains all of the primary keys for other tables: session_ID, URL_ID, scan_ID and time_ID. Thus, if in the check table 440 for address URL_ID there is a corresponding identifier session_ID, then this page with URL_ID needs to be checked with a frequency time_ID with the scan depth scan_ID.

Once the scan parameters database 330 is filled (i.e., has at least one entry in the check table 440), a scan module 340 performs the analysis of pages on web resources 370 using the scan parameters defined in the database 330 (or using default parameters). The scan module 340 initiates connection with the web resource 370 at the specified address. After the connection (i.e., data transfer protocol) 360 is established, the scan module 340 applies parameters 350 selected from the scan parameters database 330 for scanning the web resource 370.

After client authentication performed by server application 365, the server needs to load the data to a user computer 300, where the data is checked by the scan module 340. The http protocol includes transferring headers containing information about a browser, an operating system, etc.

Some resources are designed for certain applications and most of them interpret pages differently. In the event that connection is initiated, by inserting headers of Internet Explorer (IE), thereby imitating the work of this web browser, a specific IE presentation of a web page can be enforced. Page rendering scenarios can be invoked based on a browser version. The exemplary embodiment, advantageously, eliminates dependence from the client application by imitating most of them (such as, for example, Chrome, FireFox, Opera, etc.)

According to the exemplary embodiment, a process of analyzing a web resource by the scan module 340 includes employing both file anti-virus and web anti-virus (AV). The proposed AV system uses various heuristics and signature methods for detecting malware, malicious scripts and vulnerabilities in client applications.

When the web pages are transmitted using the http protocol, the scan module 340 parses them into component parts and identifies links, scripts, frames, images and other objects. Then, the scan module 340 emulates behavior of scripts, checks the URL addresses in the blacklists (i.e., AV updates are downloaded from AV vendors), compares downloaded data packets against the signatures of malicious component, checks the downloaded files, etc. After AV processing, the scan module 340 stores the results in the web pages database 380. In case of contamination or increased malware threat, a user is notified about the contaminated web resources.

Figure 5:
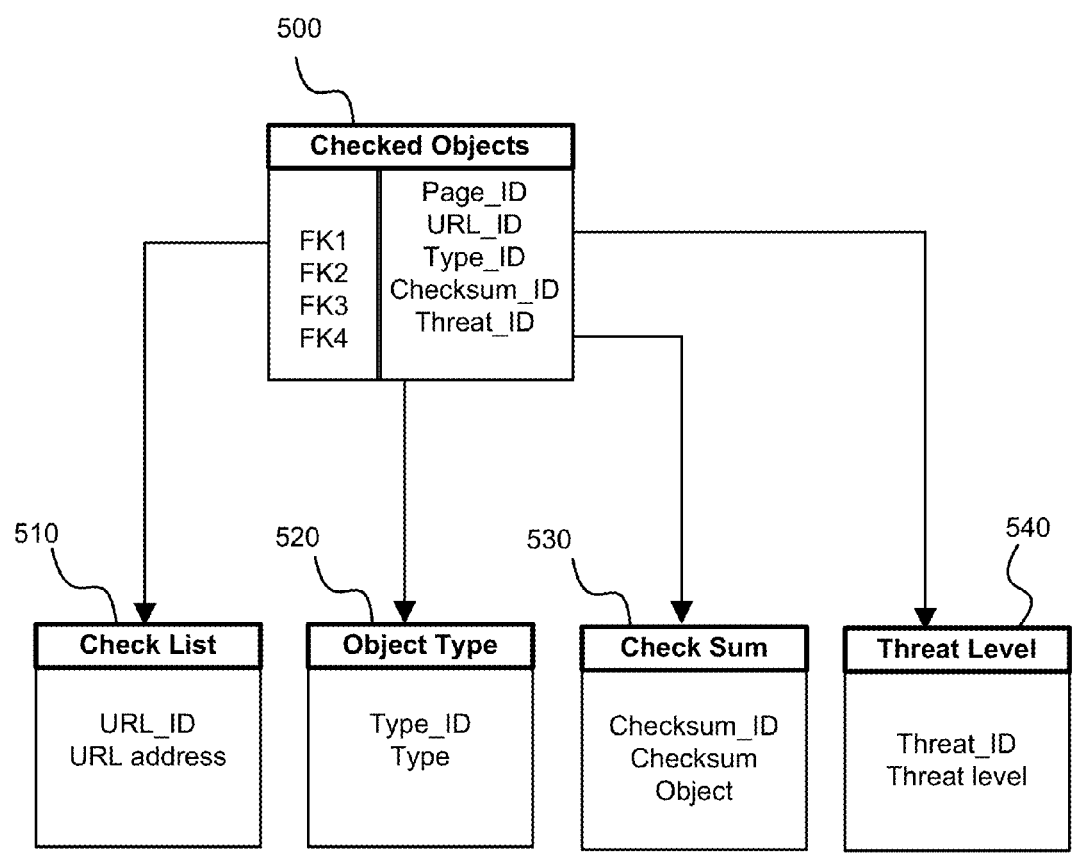
FIG. 5 illustrates a structure of a web page database, in accordance with the exemplary embodiment.

An exemplary structure of the web pages database 380 is shown in FIG. 5. The exemplary database 380 contains at least the following tables: a check list table 510, an object type table 520, a check sum table 530, a threat level table 540 and a check sum table 530. These tables are connected by a table of verified objects 500 that contains the primary keys of all the tables.

Storing data in the proposed form provides for an easy search of all objects (malicious, clean, unknown, etc.) contained in the database 380. As a result of a search in the database 380, it can be determined whether an object has changed and if the object presents a threat. According to the exemplary embodiment, the system for scheduled scanning of web resource interacts with a remote security server. The system downloads from the security server the signatures of malicious components, black lists of URLs, spam signatures, etc.

In case of web resource contamination, a report about the infection is sent to the server. This report contains at least the URL of a page containing malicious or potentially dangerous object. The system for scheduled scanning of web resource produces a detailed report about downloaded web pages. This report contains a list of URLs of checked pages and objects, the checksums of these objects, data and time of a scan and information related to a potential threat posed by each object.

The URLs can be provided to a defense module implemented on a user computer or on a local server as a parameter. If the report provided by the system for scheduled scanning of web resource is used and the address in a network filter is blocked on a local server, then none of the users connecting via this server will be able to download a page from this address. Thus, infection will be prevented.

Those skilled in the art will appreciate that the exemplary embodiment, advantageously, provides for effective detection of malware on web resources.

Figure 6:
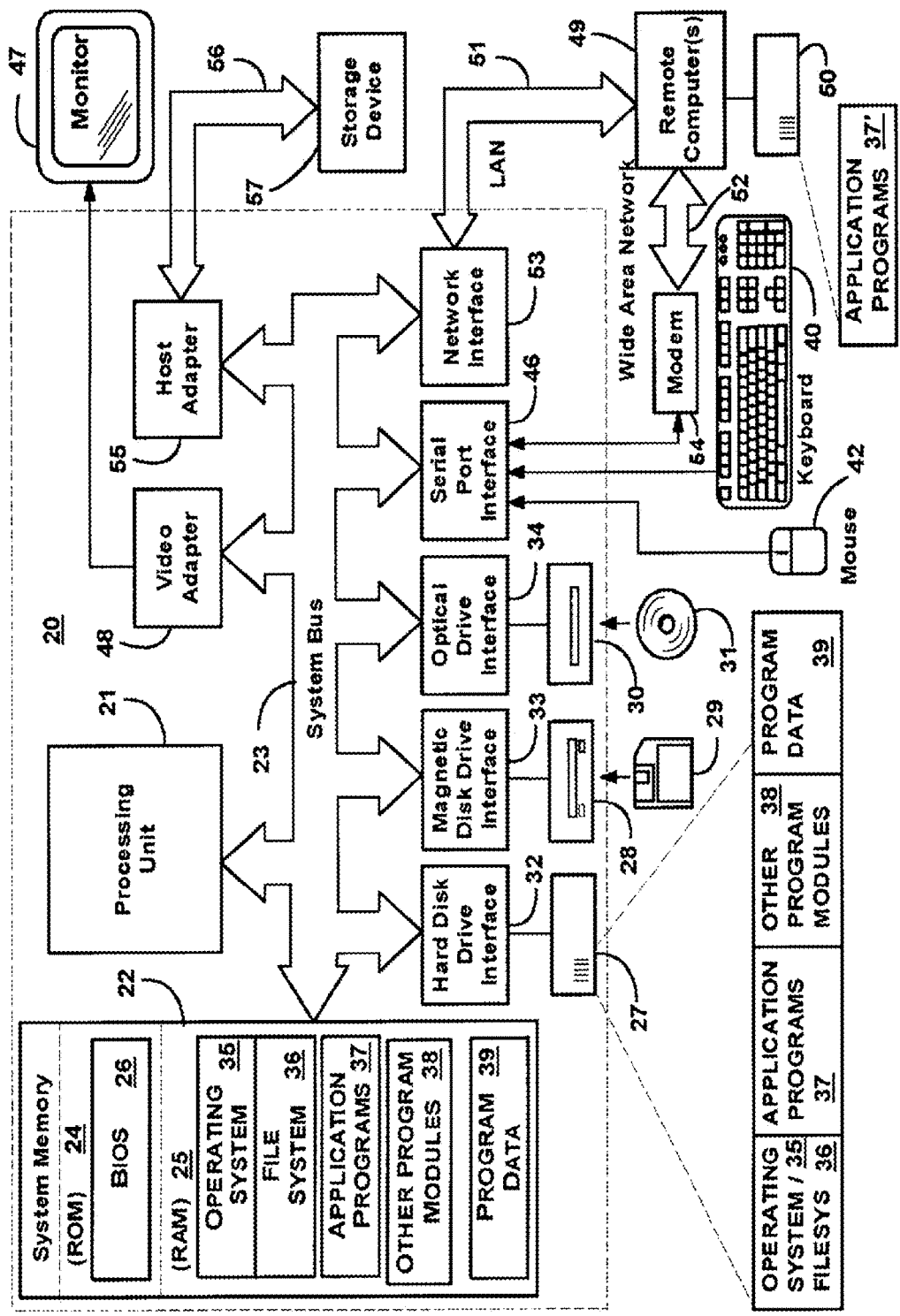
FIG. 6 illustrates a schematic of an exemplary computer system that can be used for implementation of the invention.

With reference to FIG. 6, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection of malware on web resources and prevent infection of user computers.

It should also be appreciated that various modifications, adaptations and alternative embodiments thereof may be made within the scope and spirit of the present invention. The invention is further defined by the following claims.

What is claimed is:

1. A system for scheduled malware scanning of web resources, the system comprising:
    at least one web resource having downloadable web content;
    a client computer in communication with the web resource over data transfer protocols;
    a client authentication application running on the web resource, wherein the client authentication application authenticates the client computer to the web resource;
    a check list module on the client;
    an identifier interception module on the client computer;
    a scan parameters database accessible by the check list module and by the identifier interception module;
    a scan module on the client for scanning the web resource; and
    a web pages database connected to the scan module,
    wherein:
        the check list module generates a check list of parameters for scanning the web resource and stores them in the scan parameters database;
        the identifier interception module keeps track of user identifications on the web resource and provides identifiers to the scan parameters database;
        the scan module reads scan parameters from the scan parameters database, authenticates itself to the web resource using the user identifications, and scans the web resource based on the scan parameters; and
        the scan module stores results of a scan into the web page database.

2. The system of claim 1, wherein a remote server is used instead of the client computer.

3. The system of claim 1, wherein the identifiers are used for direct authentication of the scan module to the web resource.

4. The system of claim 1, wherein the scan parameters include a scan depth.

5. The system of claim 1, wherein the scan parameters include a scan frequency.

6. The system of claim 1, wherein the check list includes addresses of web resources to be scanned.

7. The system of claim 6, wherein the list of the resources is created based on user visits and times of visits to the web resources.

8. The system of claim 1, wherein the scan module uses a file anti-virus.

9. The system of claim 1, wherein the scan module uses a web anti-virus.

10. The system of claim 1, wherein the scan module uses heuristic methods of malware detection.

11. The system of claim 1, wherein the scan module uses signature-based methods of malware detection.

12. The system of claim 1, wherein the system informs the user of malware detected on a web resource.

13. The system of claim 1, wherein the system provides parameters related to detection of malware on the web resource to a defense module for blocking this resource.

14. The system of claim 1, wherein the system emulates connection of different browsers for browser independent presentation of data downloaded from the web resource.

15. A method for scheduled malware scanning of web resources, the method comprising:

establishing connection to a web resource having downloadable web content;
launching a client authentication application on the web resource;
generating a check list of web addresses visited by a user;
intercepting and recording user identifiers;
storing a list of web addresses and the identifiers into a scan parameters database;
reading scan parameters from the scan parameters database and authenticating the client to the web resource;
scanning the web resource, using scan parameters; and
storing results of a scan, wherein the scanning employs a combination of a file anti-virus and a web ant-virus.

16. The method of claim 15, wherein the scanning uses heuristic methods of malware detection.

17. The method of claim 15, wherein the scan uses signature-based methods of malware detection.

18. The method of claim 15, wherein the scan parameters include a scan depth.

19. The method of claim 15, wherein the scan parameters include a scan frequency.

20. A computer program product comprising a non-transitory computer useable storage medium storing computer code for implementing the steps of claim 15.

* * * * *